US008997056B2

(12) United States Patent
Li et al.

(10) Patent No.: US 8,997,056 B2
(45) Date of Patent: Mar. 31, 2015

(54) DIRECTED GRAPHS PERTAINING TO READ/WRITE OPERATIONS

(75) Inventors: Xiaozhou Li, Cupertino, CA (US); Mehul A. Shah, Saratoga, CA (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 1124 days.

(21) Appl. No.: 12/968,910

(22) Filed: Dec. 15, 2010

(65) Prior Publication Data
US 2012/0159091 A1 Jun. 21, 2012

(51) Int. Cl.
G06F 9/44 (2006.01)
G06F 13/00 (2006.01)
G06F 11/36 (2006.01)

(52) U.S. Cl.
CPC ........ G06F 11/3612 (2013.01); G06F 11/3636 (2013.01)
USPC ............................ 717/128; 717/126; 711/167

(58) Field of Classification Search
USPC ......................................................... 717/128
See application file for complete search history.

(56) References Cited

U.S. PATENT DOCUMENTS 5,761,731 A * 6/1998 Van Doren et al. ........... 711/155
2004/0064656 A1 * 4/2004 Hangal et al. ................. 711/154

OTHER PUBLICATIONS

Kaiyu Chen; Malik, S.; Patra, P., "Runtime validation of memory ordering using constraint graph checking," High Performance Computer Architecture, 2008. HPCA 2008. IEEE 14th International Symposium on , vol., No., pp. 415,426, Feb. 16-20, 2008.*
Leslie Lamport. On Interprocess Communication. Distributed Computing, 1(1):86-101, 1986.*
Davidson et al., "Consistency in Partitioned Networks," Sep. 1985, ACM, Computing Surveys, vol. 17, No. 3, pp. 341-370.*
E. Anderson, X. Li, M. A. Shah, J. Tucek, and J. Wylie. What consistency does your key-value store actually provide? In Proceedings of the Sixth Workshop on Hot Topics in System Dependability (HotDep), Oct. 2010.*
E. Anderson, X. Li, M. Shah, J. Tucek, and J. J. Wylie, Oct. 21, 2010, What consistency does your key-value store actually provide?, Technical Report HPL-2010-98, Hewlett-Packard Laboratories.*
J. Misra, "Axioms for Memory Access in Asynchronous Hardware Systems," ACM Transactions on Programming Languages and Systems; 8(1):142-153; Jan. 1986.
P. B. Gibbons and E. Korach, "Testing Shared Memories," SIAM Journal on Computer; 26(4):1208-1244; Aug. 1997.

* cited by examiner

Primary Examiner — James D Rutten
(74) Attorney, Agent, or Firm — Conley Rose P. C.

(57) ABSTRACT

A system comprises a processor and storage containing software executable by the processor. The storage also contains a trace log that contains information pertaining to read and write operations and, for each read and write operation, the information is indicative of a start time, a completion time, and a value targeted by the read or write operation. Based on the trace log, the software causes the processor to construct a directed graph comprising nodes as well as edges interconnecting at least some of the nodes, each node representing a read or write operation and determine whether the constructed directed graph has a cycle. At least one edge is at least one of a data edge representing a data precedence between operations and a time edge representing a time precedence between operations, and at least one edge is a hybrid edge representing both time and data precedence between operations.

18 Claims, 6 Drawing Sheets

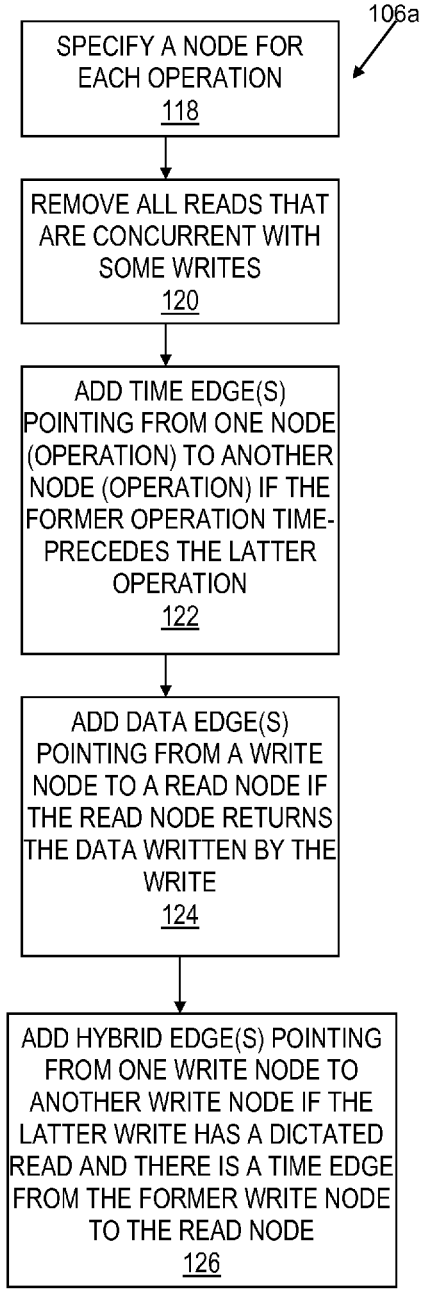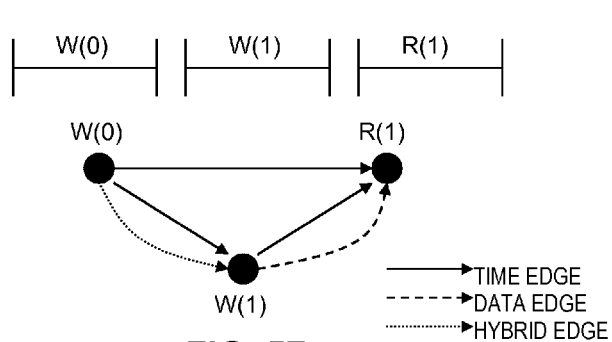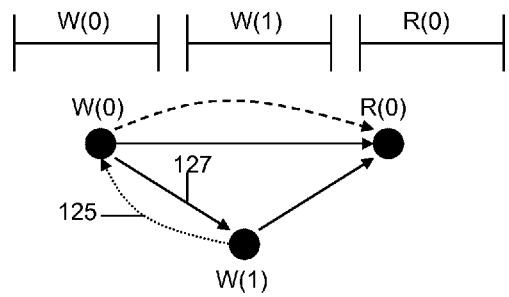
FIG. 5A
FIG. 5B
FIG. 5C

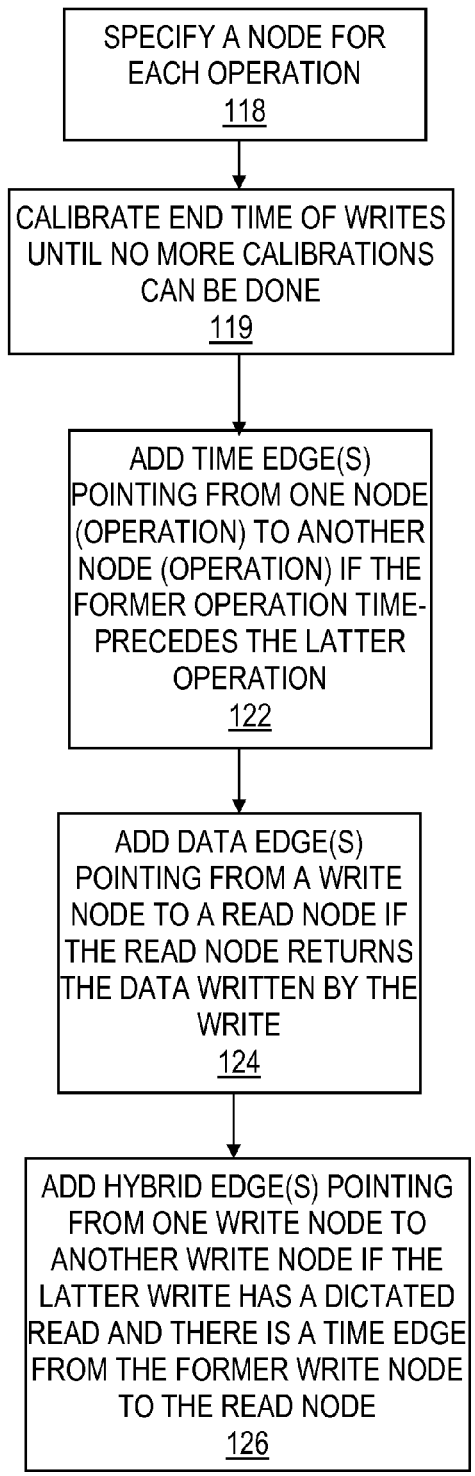
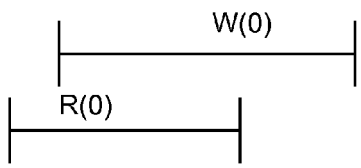
FIG. 8B
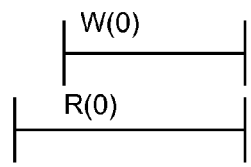
FIG. 8C
FIG. 8A

DIRECTED GRAPHS PERTAINING TO READ/WRITE OPERATIONS

BACKGROUND

In many applications, multiple processes access a common dataset to both read and write the data. Some processes may access the same data concurrently. It is possible, given the system design and performance that a read operation does not return the most recently written value.

Some systems that provide storage may advertise their system as providing a certainly level of data consistency (i.e., whether a read returns the correct value). The actual consistency level may or may not be what is advertised.

BRIEF DESCRIPTION OF THE DRAWINGS

For a detailed description of exemplary embodiments of the invention, reference will now be made to the accompanying drawings in which:

FIG. 5A illustrates a method of determining whether a system has a consistency level that is "safe" in accordance with various embodiments;

FIGS. 5B and 5C provide examples illustrating systems that are "safe" (FIG. 5B) and "unsafe" (FIG. 5C);

FIGS. 8A-8C illustrate another embodiment of atomic level checking.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
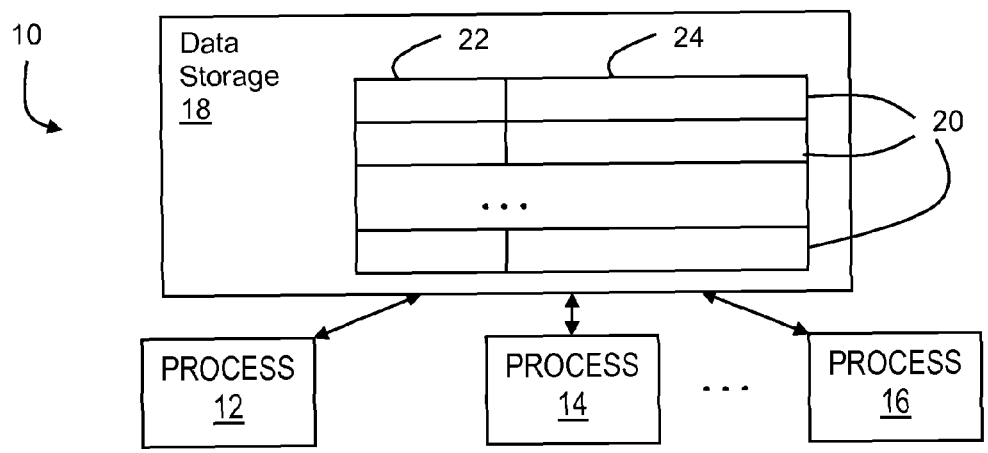
FIG. 1 shows a system in accordance with various embodiments.

FIG. 1 illustrates a system 10 in accordance with various embodiments. FIG. 1 shows processes 12, 14, and 16 interacting with a data store 18. Each process 12, 14, and 16 may comprise a processor or other logic that operates on the data store 18. The data store 18 comprises a volatile or non-volatile storage medium in which one or more data registers 20 are provided. Each register 20 comprises a storage location containing a data item 24. The data item may be a numerical value, an alphanumerical value, a graphical image, or any other type of data. In some embodiments, associated with each data item 24 is a key 22, although in other embodiments a key 22 is not provided in the data store. In the embodiment of FIG. 1, the data store 18 represents a key-value store in which the data items 24 are indexed by way of keys 22.

Figure 2A:
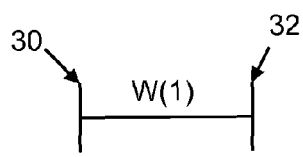
FIGS. 2A-2D illustrate various types of read and write operations in accordance with various embodiments.
Figure 2B:
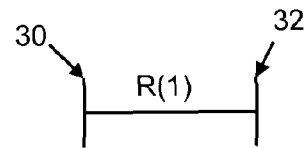

The various processes, 12, 14, and 16 can access the data registers 20 sequentially or concurrently. FIGS. 2a-2d illustrate various types of operations that each process 12, 14, and 16 can perform on the data store 18. In the embodiments described herein each process can perform at least a read operation and/or a write operation. FIG. 2a illustrates a write operation designated with a "W(1)." The number in parentheses (e.g., "1" in this example) is the data being written to the data store by the write operation. The write operation in FIG. 2a has a start time identified with reference numeral 30 and a completion time 32. Each operation requires a finite period of time to complete due to latencies in communication between each process 12, 14, 16 and the data store 18 as well as the latency inherent to the writing of and retrieval of information from within the data store 18 itself. FIG. 2b illustrates a read operation identified by "R(1)." The number 1 in parentheses in FIG. 2b refers to the value returned upon completion of the read operation. Thus, in FIG. 2a the write operation wrote a value of 1 and the read operation of FIG. 2b returned that very same value, 1. The read operation in FIG. 2b also has a start time 30 and a completion time 32.

Figure 2C:
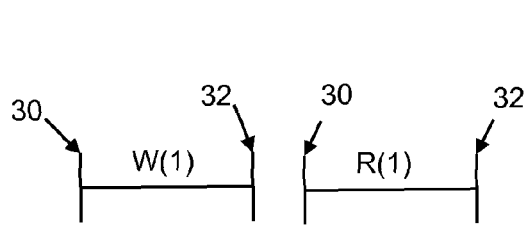

FIG. 2c illustrates sequential write and read operations each with its own start time 30 and completion time 32. As illustrated in FIG. 2c, the read operation R(1) does not start until after the completion of the preceding write operation W(1). The write operation is said to "time-precede" the read operation. Further, because the read operation returns the value written by the preceding write operation, the write operation is said to be the "dictating write" of the read, and the read is referred to as a "dictated read" of the write. A write can have any number of dictated reads. In at least some embodiments, each write writes a distinct value, that is, no two writes write the same exact data value.

Figure 2D:
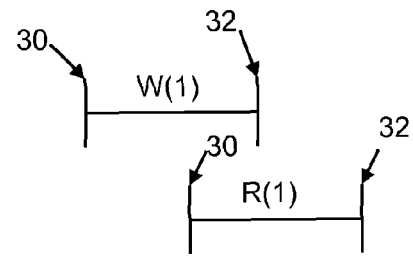

In FIG. 2d the write and read operations are "concurrent." In this context, concurrent operations are operations in which one operation does not precede the other (i.e., one operation does not complete before the other operation begins). As shown in FIG. 2d the read operation R(1) begins after the write operation W(1) begins but before the write operation completes.

Figure 3:
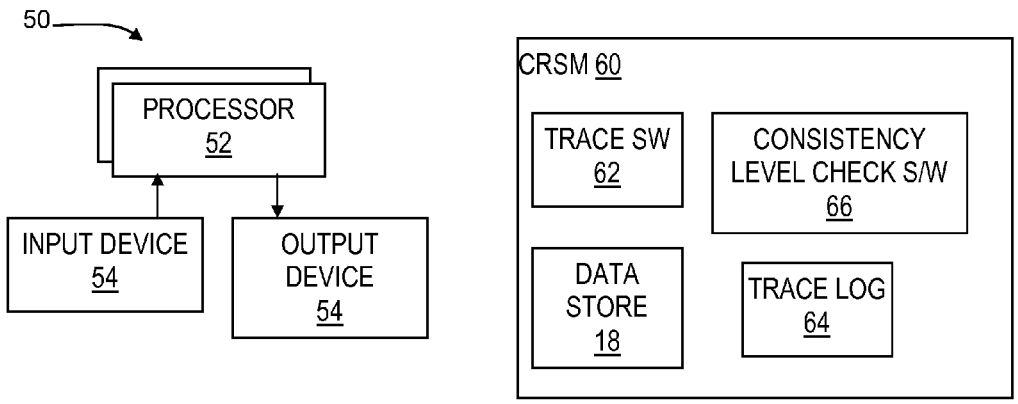
FIG. 3 shows another system in accordance with various embodiments.

FIG. 3 illustrates a block diagram 50 corresponding to system 10 in FIG. 1. As show in FIG. 3, the system 50 comprises one or more processors 52 an input device 54, an output device 56, and a computer-readable storage medium (CRSM) 60. The CRSM 60 comprises the data store 18, trace software 62, a trace log 64, and consistency level check software 66. The CRSM 60 comprises volatile memory (e.g., random access memory), non-volatile storage (e.g., hard disk drive, Flash drive, read-only memory (ROM). CD-ROM, Compact Disk read-only memory, etc.), or combinations thereof.

In some embodiments, the trace software 62 is executed by one or more of processors 52 to thereby comprise trace logic that monitors the operation of the various processes 12, 14, 16 as such processes access the data store 18. For each read and write operation the trace software records the value of the data being written or read, the start time 30, and the completion time 32. These three pieces of information (data value, start time, and completion time) are stored to in a trace log 64. In some embodiments the trace log 64 is implemented as a file, but can be implemented in other forms as desired. The start and completion times can be ascertained using any of a variety of techniques such as by the use of timers or a time-of-day function.

The consistency level check software 66 also is executed by one or more processors 52. The consistency level check software 66 analyzes the content of the trace log 64 to determine whether the system has achieved a certain specified level of consistency—safe, regular, or atomic.

Figure 4:
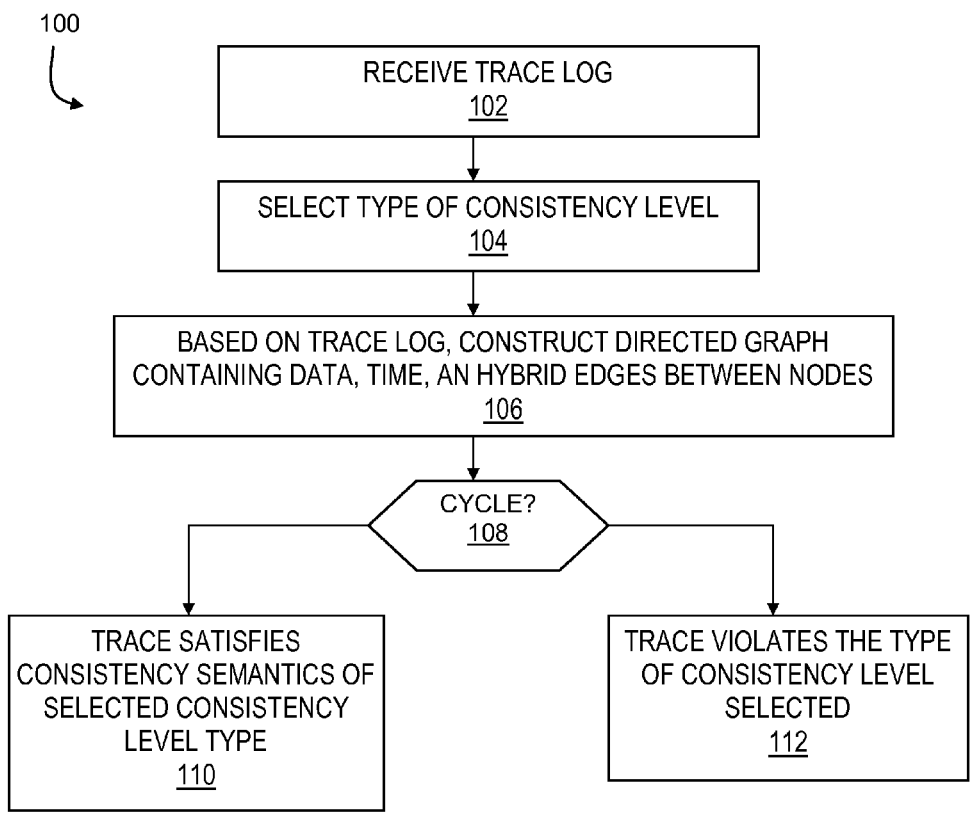
FIG. 4 shows a method in accordance with various embodiments.

FIG. 4 illustrates a method 100 comprising actions 102-112. The actions shown can be performed in the order shown in FIG. 4 or in a different order. Further, two or more of the actions may be performed in parallel instead of sequentially. At 102, the method 100 comprises receiving a trace log 64. In some embodiments, the trace log 64 is received by the consistency level check software 66 while executed by processor 52. At 104, the method comprises selecting a target type of consistency level. The choices of consistency level include safe, regular, and atomic. The selection of consistency levels may be provided by a user via input device 54 or the consistency level check software 66 may automatically select a consistency type level.

At 106, based on the contents of the trace log, the method comprises constructing a directed graph containing nodes and data, time, and hybrid edges between at least some of the nodes. The consistency level check software 66 constructs the directed graph. Each node in the directed graph represents a read or write operation. Thus, if the trace log 64 contains references to 5 read/write operations, the corresponding directed graph will have 5 nodes. The term "vertex" can be substituted for the term "node." Each edge between a pair of nodes has a direction and thus points from one node to another node. A data edge points from a write node (a node representing a write operation) to a read node (a node representing a read operation). For a data edge, the read operation reads returns the value written by the corresponding write operation and thus depicts a "data precedence." A time edge depicts a "time precedence" between two nodes. A time edge points from a first node to a second node thereby indicating that the first node completes before the second node begins (i.e., the first and second nodes are not concurrent). A hybrid edge will be explained in greater detail below.

Constructing a directed graph does not necessarily mean generating a visual graph to present to a user via, for example, output device 56. Instead, the consistency level check software 66 generates a data structure that represents the directed graph.

Figure 6A:
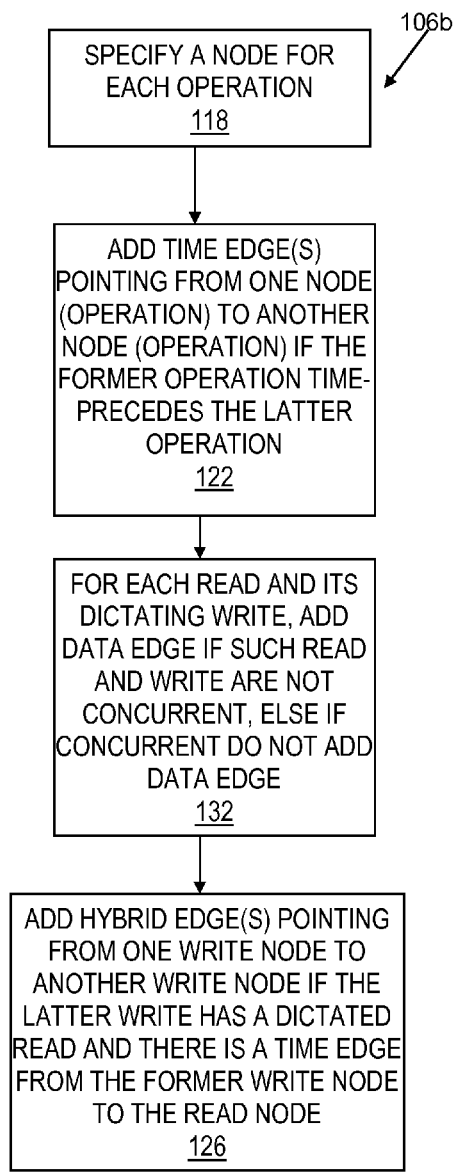
FIG. 6A illustrates a method of determining whether a system has a consistency level that is "regular" in accordance with various embodiments.
Figure 6B:
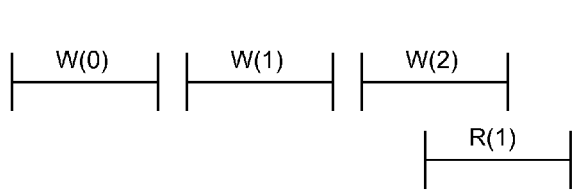
FIGS. 6B and 6C provide examples illustrating systems that are "regular" (FIG. 6B) and "not regular" (FIG. 6C)
Figure 6B:
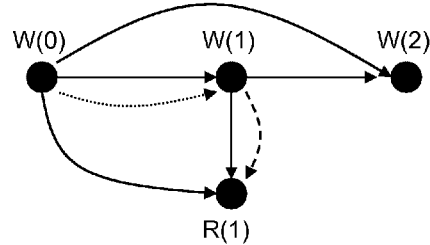
Figure 6C:
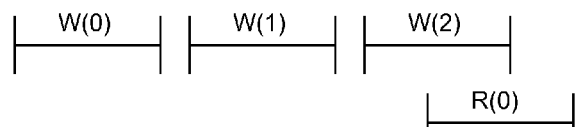
Figure 6C:
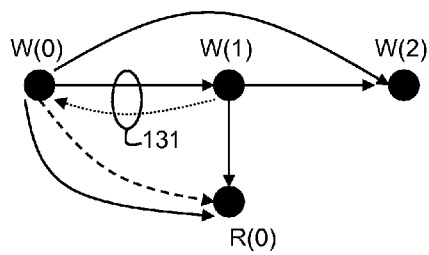
Figure 7A:
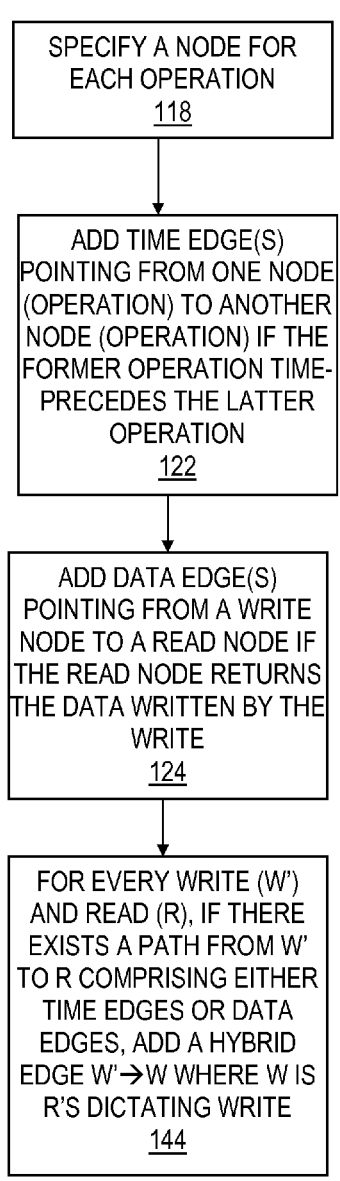
FIG. 7A illustrates a method of determining whether a system has a consistency level that is "atomic" in accordance with various embodiments.
Figure 7B:
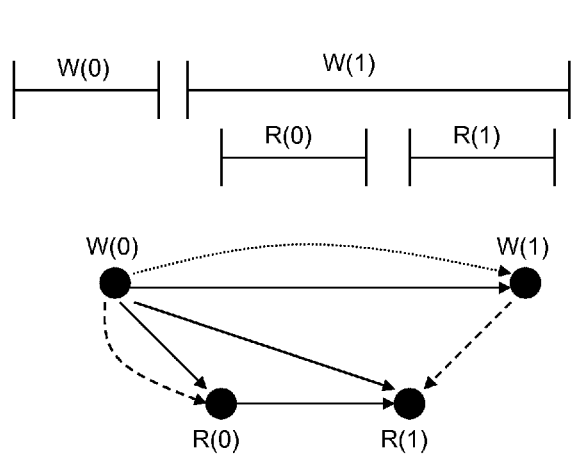
FIGS. 7B and 7C provide examples illustrating systems that are "atomic" (FIG. 7B) and "not atomic" (FIG. 7C)
Figure 7C:
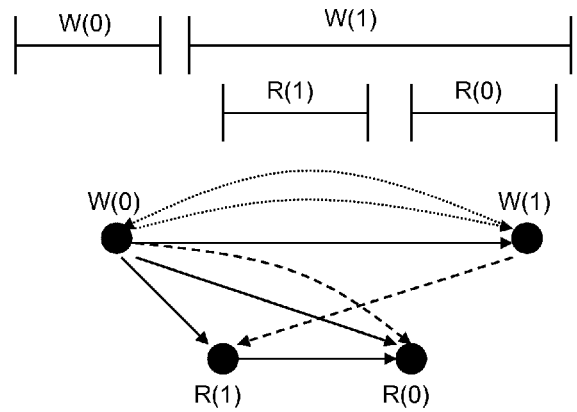

The directed graph is constructed while applying various semantics associated with the selected consistency level. For example, if the atomic consistency level is selected at 104, then the directed graph constructed at 106 applies various semantics associated with atomicity. Examples of the construction of directed graphs for the three consistency levels are illustrated in FIGS. 5-7 and will be discussed in greater detail below. FIGS. 5*a*-5*c* illustrate how a directed graph is constructed based on semantics associated with safety. FIGS. 6*a*-6*c* illustrate how a directed graph is constructed based on semantics associated with regularity. FIGS. 7*a*-7*c* illustrate how a directed graph is constructed based on semantics associated with atomicity.

Referring still to FIG. 4, once the directed graph is constructed at 106, control passes to decision 108 in which the consistency level check software 66 analyzes the directed graph to determine if one or more "cycles" are present. A cycle is a path from one node to another node and back to the former node. A directed graph that contains one or more cycles is said to be "acyclic." In accordance with various embodiments, a directed graph does not contain any cycles if and only if it satisfies the consistency semantics of the selected consistency level type (110). For example if the consistency level types selected is atomic and no cycles are present in the resulting directed graph, then the system from which the trace log 64 was obtained is said to have achieved atomic consistency. However, if one more cycles are present in the trace log, then the system is said to violate the type of consistency level selected (112) on which the directed graph was generated.

FIG. 5*a* illustrates an implementation of action 106 in FIG. 4 (designated as 106*a* in FIG. 5) if the "safe" consistency level was selected at 104. The consistency level check software 66 while executed by a processor 52 may perform 106*a*.

At 118, the method of FIG. 5*a* comprises specifying a node for each operation in the trace log 64 being analyzed. Thus, a node is assigned for each write operation and a node is assigned for each read node as well. Specifying a node may comprise adding an entry into a data structure that will define the directed graph being constructed. At 120, the method of FIG. 5*a* comprises removing all read operations that are concurrent with at least some write operations (i.e., removing all nodes corresponding to such read operations). At 122, the method comprises adding time edges pointing from one node to another node if the operation corresponding to the former mode time-precedes the operation corresponding to the latter node. At 124, the method further comprises adding data edges pointing from a write node to a read node if the read operation corresponding to the read node returns the data written by the write operation corresponding to the write node. Finally, at 126 "hybrid" edges are added pointing from one write node to another write node if the latter write has a dictated read and there is a time edge from the former write to the read. As explained previously, a dictated read of a write refers to a read that returns the value written by that particular write.

FIGS. 5*b* and 5*c* show examples of directed graphs constructed according to the method in FIG. 5*a* which implement semantics associated with the safe level of consistency. In the example of FIG. 5*b* the directed graph indicates that the system has achieved a safe consistency level, and in FIG. 5*c* the graph is unsafe. In the example of FIG. 5*b*, three operations are shown in sequential order. A first write writes a value 0 followed by a second write that writes a value of 1 and is followed by a read that returns the value of the second write (i.e., 1). FIG. 5*b* also shows the corresponding directed graph as comprising three nodes corresponding to the two write operations and one read operation. The solid arrows represent time edges in the directed graph. The large dashed edges represent data edges, and the small dashed edges represent hybrid edges. Because W(0) precedes W(1) which itself precedes R(1), a time edge points from W(0) to W(1) and also from W(0) to R(1). A third time edge is shown from W(1) to R(1). Because the R(1) read operation returns the value of W(1), a data edge is shown pointing from W(1) to R(1). The inclusion of the time and data edges occurs due to 122 and 124, respectively, in FIG. 5a.

A single hybrid edge is shown in FIG. 5b from W(0) to W(1). The inclusion of this hybrid edge follows from 126 in FIG. 5a from one write operation to another operation because the latter write operation, W(1), has a dictated read, R(1). Upon constructing the directed graph in FIG. 5b one can see that there are no cycles. A cycle is a path from one node another node and back to the former node. In FIG. 5b there is no closed loop path from one node to another node and back again. Thus, the directed graph FIG. 5b, which was implemented according to the semantics corresponding to safe consistency, is deemed to be in compliance with the safe consistency level because no cycles are detected.

In the example of FIG. 5c the same two write operations are present but the read operations returns a value of 0, that is the value written by the first write operation. The corresponding directed graph is shown in FIG. 5c. The time edges are similar to the time edges included in the directed graph of FIG. 5b. The data edge points from W(0) to R(0) in accordance with 124 in FIG. 5a. Further, a hybrid edge points from W(1) back to W(0) because the latter write W(0) has a dictated read, R(0). In the example of FIG. 5c, a cycle can be observed between W(0) and W(1) represented by the time edge 127 and hybrid edge 125 which point in opposite directions. Because a cycle exists in the directed graph of FIG. 5c the system which generated the trace log 64 on which the directed graph was constructed is deemed unsafe (i.e., not in compliance with the safe consistency level).

Using any suitable technique such as "depth-first search," cycles in a directed graph can be efficiently detected. By keeping a counter and incrementing it as soon as a cycle is detected, the number of cycles in the graph can be counted if desired.

FIG. 6a illustrates a method embodiment of the implementation of 106 in FIG. 4 (designated as 106b in FIG. 6a) for a selected consistency level type of "regular." The method 106b of FIG. 6a is similar to the method 106a of FIG. 5a with the following differences. Action 120 in which all reads concurrent with some writes are removed is not performed in the method of 6a. Further, action 124 in FIG. 5a is modified as shown in step 132 in FIG. 6a. Actions 130 and 134 in FIG. 6a are performed as described above. At 132, the method 106b comprises, for each read and its dictating write, adding a data edge from the write to the read if such a read and write are not concurrent. Otherwise, if such read and write operations are concurrent, no data edge is added between the corresponding read and write nodes.

FIG. 6B is an example of a sequence of write and read operations for which the directed graph has no cycles. The solid line time edges are added to specify that W(0) precedes W(1), that W(1) precedes W(2) and that each of W(0) and W(1) precede R(1). A large dashed data edge extends from W(1) to R(1) to indicate the data dependency R(1) has on W(1). Per 132, the data edge can be added because W(1) and R(1) are not concurrent. A single hybrid edge (small dashed edge) extends from W(0) to W(1) in accordance with action 126. Because no cycles are present in the directed graph of FIG. 6B, the system which produced the trace log 64 from which the directed graph was constructed is said to be regular.

FIG. 6C provides an example of set of operations that are not regular. The operations are similar to that of FIG. 6B but the read operation returns a value of 0 (corresponding to W(0)). The directed graph associated with this set of operations is also shown in FIG. 6C. The time edges are the same as in FIG. 6B. The data edge (large dashed edge) points from W(1) to R(0) because R(0) has a data dependency on W(0) and W(0) and R(0) are not concurrent per action 132. The small dashed hybrid edge points from W(1) to W(0) per action 126. The combination of the hybrid edge and time edge between W(1) and W(0) designated by reference numeral 131 comprises a cycle thereby indicating the system which produced the trace log 64 from which the directed graph was constructed is said to be irregular.

FIG. 7a illustrates a method embodiment of the implementation of 106 in FIG. 4 (designated as 106c in FIG. 6a) for a selected consistency level type of "atomic." The method 106c of FIG. 7a is similar to the method 106a of FIG. 5a with the following differences. Action 120 in which all reads concurrent with some writes are removed is not performed in the method of 7a. The action 126 in FIG. 5a in which hybrid edges are added is replaced with action 144 in FIG. 7a. Actions 122 and 124 in which time and data edges are added is the same between methods 106a and 106c in FIGS. 5a and 7a, respectively.

Per action 144, the method comprises for every write (W') and read (R) where W' is not R's dictating write, if a path exists from W' to R comprising either time or data edges, adding a hybrid edge from W' to W where W is R's dictating write.

FIG. 7b is an example of a sequence of write and read operations for which the directed graph has no cycles. Four solid line time edges are added to specify that W(0) precedes W(1), that W(0) precedes R(0), that W(0) precedes R(1), and that R(0) precedes R(1). Two large dashed data edges extend from W(0) to R(0) and from W(1) to R(1) to indicate the data dependency that each of R(0) and R(1) has on W(0) and W(1), respectively. A single hybrid edge (small dashed edge) extends from W(0) to W(1) in accordance with action 126. Because no cycles are present in the directed graph of FIG. 7B, the system, which produced the trace log 64 from which the directed graph was constructed, is said to be atomic.

FIG. 7C provides an example of set of operations that are not regular. The operations are similar to that of FIG. 7B but the order of the read operations is reversed (R(1) followed by R(0) instead of the other way around in FIG. 7B). The directed graph associated with this set of operations is shown in FIG. 7C. The time edges are similar to those shown in FIG. 6B (with nodes R(0) and R(1) reversed. Two large dashed data edges extend from W(0) to R(0) and from W(1) to R(1) to indicate the data dependency that each of R(0) and R(1) has on W(0) and W(1), respectively. Two small dashed hybrid edges point from W(0) to W(1) and from W(1) to W(0) per action 144. The combination of the hybrid edges comprises a cycle thereby indicating that the system, which produced the trace log 64 from which the directed graph was constructed, is deemed not to be atomic.

FIG. 8a illustrates another method embodiment of the implementation of 106 in FIG. 4 (designated as 106d in FIG. 8a) for atomic level consistency checking. As with the atomic checking method of FIG. 7A, the method of FIG. 8A does not include the action of removing all reads concurrent with some writes. After specifying a node for each read/write operation (118), the method 106d of FIG. 8A comprises calibrating (119) the end time of writes to coincide with the end time of dictated reads with which the writes overlap in time. FIGS. 8B and 8C illustrate this calibration process. In FIG. 8B, W(0) is the dictating write of read R(0). The write's end time extends past the end time of the read. The write thus overlaps the read. The calibration to the write is to shorten its end time to coincide with the end of the read as illustrated in FIG. 8C. This calibration process continues for all such overlapping write/read operations. The remaining actions 122-126 of the method of FIG. 8A are as described above. It should be noted that the methodology by which hybrid edges are added (126) is the same as in the safe and regular checking techniques of FIGS. 5A and 6A.

In some embodiments, a user selects a specific type of consistency to be checked for the system. In other embodiments, the consistency level check software 66 is preprogrammed to select a particular type of consistency. In other embodiments, the software 66 selects each of the three types of consistency levels and performs the relevant methods to determine whether the system complies with the selected consistency level. For example, the software 66 first may select the safe consistency level and perform the safety check method described above with regard to FIGS. 4 and 5a. The software 66 then may select the regular consistency level and perform the methods of FIGS. 4 and 6a to determine whether the system is regular. Finally, the software 66 may select the atomic consistency level and perform the methods of FIGS. 4 and 7a to determine whether the system is atomic.

Additionally, the consistency level check software 66 may count the number of cycles found in a given directed graph. In the examples of FIGS. 5c, 6c, and 7c, only a single cycle was found, but other directed graphs constructed according to the methods described herein may have more than one cycle. The consistency level check software 66 may report to the number of cycles which provides and indication of the extent to which the system is in violation of the relevant level of consistency.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
receiving, by a hardware processor, a trace log from storage containing information pertaining to read and write operations and, for each read and write operation, the trace file contains a start time, a completion time, and a value targeted by the read or write operation;
based on the trace log, constructing, by the hardware processor, a directed graph comprising nodes as well as edges interconnecting the nodes, each node representing a read or write operation; and
determining, by the hardware processor, whether the constructed directed graph has any cycles;
wherein at least one edge is a data edge representing a data precedence between operations, at least one edge is a time edge representing a time precedence between operations, and at least one edge is a hybrid edge representing both time and data precedence between operations, and wherein the hybrid edge is an edge from one node representing a write operation to another node representing a different write operation.

2. The method of claim 1 wherein constructing the directed graph comprises adding at least one hybrid edge pointing from a first write node to a second write node if the second write node has a dictated read and the first write node has a time edge to the dictated read.

3. The method of claim 1 wherein constructing the directed graph comprises adding at least one hybrid edge pointing from a first write node to a second write, and wherein adding the at least one hybrid edge comprises:
for every write operation (W') and read operation (R), determining if a path exists from W' to R comprising time or data edges.

4. The method of claim 3 wherein adding the at least one hybrid edge further comprises adding the at least one hybrid edge from a node representing W' to a node representing another write (W) where W is R's dictating write.

5. The method of claim 1 wherein constructing the directed graph comprises adding at least one time edge pointing from a first node to second node where the operation represented by the first node time-precedes the operation represented by the second node.

6. The method of claim 1 wherein constructing the directed graph comprises adding at least one data edge pointing from a write node to a read node if the read operation represented by read node returns a data value that was written by the write operation represented by the write node.

7. The method of claim 1 wherein constructing the directed graph comprises adding at least one data edge pointing from a write node, representing a write operation, to a read node, representing a read operation, based on the read returning a value written by the write and that the read and write operations are not concurrent.

8. A computer-readable storage medium storing software which, when executed by a processor, causes the processor to:
receive a trace log that contains information pertaining to read and write operations and, for each read and write operation, the information is indicative of a start time, a completion time, and a value targeted by the read or write operation;
based on the trace log, construct a plurality of directed graphs, each of the graphs constructed in accordance with semantics of different consistency levels and comprising nodes as well as edges interconnecting at least some of the nodes, each node representing a read or write operation; and
determine whether each constructed directed graph has a cycle to assess compliance with each consistency level;
wherein at least one edge is at least one of a data edge representing a data precedence between operations and a time edge representing a time precedence between operations, and at least one edge is a hybrid edge representing both time and data precedence between operations.

9. The computer-readable storage medium of claim 8 wherein the consistency levels include safe, regular, and atomic consistency levels.

10. The computer-readable storage medium of claim 8 wherein, for at least one of the directed graphs, for every write operation (W') and read operation (R), the software causes the processor to determine if a path exists from W' to R comprising time or data edges to determine whether to add the hybrid edge to the graph.

11. The computer-readable storage medium of claim 10 wherein the software is to further cause the processor to add the hybrid edge from W' to a node representing another write W based on W being R's dictating write.

12. The computer-readable storage medium of claim 8 wherein the software causes the processor to construct the directed graph by adding at least one time edge pointing from a first node to second node where the operation represented by the first node time-precedes the operation represented by the second node.

13. The computer-readable storage medium of claim 8 wherein the software causes the processor to construct the directed graph by calibrating an end time of a write operation to coincide with an end time of a corresponding read operation with which the write operation otherwise overlaps.

14. The computer-readable storage medium of claim 8 wherein the software causes the processor to construct the directed graph by adding at least one data edge pointing from a write node, representing a write operation, to a read node, representing a read operation, based on the read returning the value written by the write and the read and write operations not being concurrent.

15. A system, comprising:
   a processor; and
   storage containing software executable by said processor, said storage also containing a trace log that contains information pertaining to read and write operations and, for each read and write operation, the information is indicative of a start time, a completion time, and a value targeted by the read or write operation;
   wherein, based on the trace log, the software causes the processor to construct a plurality of directed graphs, each of the directed graphs constructed in accordance with semantics of different consistency levels and comprising nodes as well as edges interconnecting at least some of the nodes, each node representing a read or write operation, and the software further causes the processor to determine whether each constructed directed graph has a cycle;
   wherein at least one edge is at least one of a data edge representing a data precedence between operations and a time edge representing a time precedence between operations, and at least one edge is a hybrid edge representing both time and data precedence between operations and wherein the hybrid edge is an edge from one node representing a write operation to another node representing a different write operation.

16. The system of claim 15 wherein the software causes the processor to construct at least one of the directed graphs by causing the processor to add at least one hybrid edge pointing from a first write node to a second write, and to determine, for every write operation (W') and read operation (R), whether a path exists from W' to R comprising time or data edges.

17. The system of claim 16 wherein the software causes the processor to add the at least one hybrid edge from W' to another node representing another write (W) where W is R's dictating write.

18. The system of claim 15 wherein the software causes the processor to construct the directed graph by causing the processor to add the least one hybrid edge pointing from a first write node to a second write node if the second write node has a dictated read.

* * * * *